United States Patent
Nishii et al.

(10) Patent No.: US 12,544,857 B2
(45) Date of Patent: Feb. 10, 2026

(54) WELDING METHOD AND WELDING APPARATUS

(71) Applicant: FURUKAWA ELECTRIC CO., LTD., Tokyo (JP)

(72) Inventors: Ryosuke Nishii, Tokyo (JP); Takashi Kayahara, Tokyo (JP); Toshiaki Sakai, Tokyo (JP); Tomomichi Yasuoka, Tokyo (JP); Takashi Shigematsu, Tokyo (JP)

(73) Assignee: FURUKAWA ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 17/002,948

(22) Filed: Aug. 26, 2020

(65) Prior Publication Data

US 2020/0384574 A1     Dec. 10, 2020

Related U.S. Application Data

(63) Continuation of application No. PCT/JP2019/014452, filed on Apr. 1, 2019.

(30) Foreign Application Priority Data

Mar. 30, 2018     (JP) ................. 2018-069276

(51) Int. Cl.
   *B23K 26/24*     (2014.01)
   *B23K 26/064*    (2014.01)
   *B23K 26/21*     (2014.01)

(52) U.S. Cl.
   CPC ............ *B23K 26/21* (2015.10); *B23K 26/064* (2015.10)

(58) Field of Classification Search
   CPC ........................ B23K 26/064; B23K 26/21
   (Continued)

(56) References Cited

U.S. PATENT DOCUMENTS 3,881,084 A * 4/1975 Baardsen ........... B23K 15/0093
                                                         219/137 R
4,023,005 A * 5/1977 Bolin .................... B23K 26/18
                                                         219/121.64
(Continued)

FOREIGN PATENT DOCUMENTS

CN       102059452 A     5/2011
JP       7-155974 A      6/1995
(Continued)

OTHER PUBLICATIONS

International Search Report dated May 14, 2019 in PCT/JP2019/014452 filed Apr. 1, 2019, 2 pages.
(Continued)

*Primary Examiner* — Jimmy Chou
(74) *Attorney, Agent, or Firm* — Oblon, McClelland, Maier & Neustadt, L.L.P.

(57) ABSTRACT

A welding method includes: forming a workpiece by stacking plated sheet members having a plating layer formed on a surface of a base material; disposing the workpiece in an area to be irradiated with laser light; irradiating a surface of the workpiece with a plurality of beams by dispersing positions such that centers of the beams do not overlap with each other within a prescribed area on the surface; while continuing the irradiation, relatively moving the beams and the workpiece and sweeping the beams on the workpiece so as to melt an irradiated part of the workpiece for performing welding; and setting a distance between the beams to be emitted such that weld pools formed in the workpiece by irradiation of each of the beams overlap with each other.

11 Claims, 15 Drawing Sheets

(58) Field of Classification Search
USPC .................................... 219/121.64, 121.63
See application file for complete search history.

(56) References Cited

U.S. PATENT DOCUMENTS

| | | | | |
|---|---|---|---|---|
| 4,642,446 | A * | 2/1987 | Pennington | B23K 26/32 |
| | | | | 219/137 WM |
| 4,697,061 | A * | 9/1987 | Spaeter | H01L 24/85 |
| | | | | 219/121.64 |
| 5,142,119 | A * | 8/1992 | Hillman | B23K 26/123 |
| | | | | 219/121.84 |
| 5,155,323 | A * | 10/1992 | Macken | B23K 26/24 |
| | | | | 219/121.64 |
| 5,183,991 | A * | 2/1993 | Arai | B23K 26/323 |
| | | | | 219/121.84 |
| 5,183,992 | A * | 2/1993 | Bilge | B23K 26/32 |
| | | | | 219/121.84 |
| 5,268,556 | A * | 12/1993 | Coyle, Jr. | B23K 26/32 |
| | | | | 219/121.61 |
| 5,343,014 | A * | 8/1994 | Ogino | B23K 26/323 |
| | | | | 219/121.64 |
| 5,347,528 | A * | 9/1994 | Haruta | B23K 26/0648 |
| | | | | 219/121.64 |
| 5,389,761 | A * | 2/1995 | Kresse, Jr. | B23K 26/244 |
| | | | | 228/205 |
| 5,591,359 | A * | 1/1997 | Saitou | B23K 33/00 |
| | | | | 219/121.64 |
| 5,603,853 | A * | 2/1997 | Mombo-Caristan | |
| | | | | B23K 26/123 |
| | | | | 219/121.64 |
| 5,841,097 | A * | 11/1998 | Esaka | B23K 26/067 |
| | | | | 219/121.64 |
| 6,040,550 | A * | 3/2000 | Chang | B23K 26/0823 |
| | | | | 219/121.64 |
| 6,359,252 | B1 * | 3/2002 | Sanjeu | B23K 26/06 |
| | | | | 219/121.64 |
| 6,608,278 | B1 * | 8/2003 | Xie | B23K 26/244 |
| | | | | 219/121.64 |
| 6,646,225 | B1 * | 11/2003 | Wang | B23K 26/0608 |
| | | | | 219/121.64 |
| 6,740,845 | B2 * | 5/2004 | Stol | B23K 26/242 |
| | | | | 219/121.64 |
| 6,750,421 | B2 * | 6/2004 | Hermann | B23K 26/361 |
| | | | | 219/121.64 |
| 6,914,213 | B2 * | 7/2005 | Alips | B23K 26/067 |
| | | | | 219/121.64 |
| 6,932,879 | B2 * | 8/2005 | Ely | B23K 26/323 |
| | | | | 148/516 |
| 7,693,696 | B2 * | 4/2010 | Forrest | B23K 26/0608 |
| | | | | 700/250 |
| 8,253,062 | B2 * | 8/2012 | Forrest | B23K 26/0622 |
| | | | | 219/121.64 |
| 9,266,195 | B2 * | 2/2016 | Yano | B23K 26/0608 |
| 9,676,061 | B2 * | 6/2017 | Canourgues | C21D 6/008 |
| 9,944,048 | B2 * | 4/2018 | Nishikawa | B23K 26/244 |
| 10,355,441 | B2 * | 7/2019 | Yamamoto | H01S 5/11 |
| 10,668,570 | B2 * | 6/2020 | Schmit | B23K 26/348 |
| 10,688,595 | B2 * | 6/2020 | Yang | B23K 26/244 |
| 10,828,729 | B2 * | 11/2020 | Cretteur | C23C 28/021 |
| 11,148,226 | B2 * | 10/2021 | Yang | B23K 26/22 |
| 2002/0142184 | A1 * | 10/2002 | Mazumder | B23K 26/244 |
| | | | | 219/121.64 |
| 2002/0144984 | A1 * | 10/2002 | Mori | B23K 26/244 |
| | | | | 219/121.64 |
| 2003/0217993 | A1 * | 11/2003 | Stol | B23K 26/082 |
| | | | | 219/121.64 |
| 2004/0031561 | A1 * | 2/2004 | Ely | B23K 26/244 |
| | | | | 156/87 |
| 2004/0173586 | A1 * | 9/2004 | Musselman | B23K 26/32 |
| | | | | 219/121.64 |
| 2004/0173587 | A1 * | 9/2004 | Musselman | B23K 26/244 |
| | | | | 219/137 R |
| 2004/0200813 | A1 * | 10/2004 | Alips | B23K 26/1438 |
| | | | | 219/121.64 |
| 2005/0121426 | A1 * | 6/2005 | Wang | B23K 26/244 |
| | | | | 219/121.64 |
| 2006/0044565 | A1 * | 3/2006 | Matsumura | H01L 21/02532 |
| | | | | 356/464 |
| 2006/0144828 | A1 * | 7/2006 | Fukumitsu | B28D 1/221 |
| | | | | 219/121.67 |
| 2006/0278618 | A1 * | 12/2006 | Forrest | B23K 26/244 |
| | | | | 219/121.64 |
| 2008/0116175 | A1 * | 5/2008 | Ballerini | B23K 26/24 |
| | | | | 219/121.64 |
| 2008/0302768 | A1 * | 12/2008 | Mazumder | B23K 26/244 |
| | | | | 219/121.64 |
| 2009/0220815 | A1 * | 9/2009 | Canourgues | C22C 38/28 |
| | | | | 428/653 |
| 2009/0236321 | A1 * | 9/2009 | Hayashi | H01R 4/029 |
| | | | | 219/121.64 |
| 2009/0283505 | A1 * | 11/2009 | Naumovski | C10M 169/04 |
| | | | | 219/121.64 |
| 2012/0000892 | A1 * | 1/2012 | Nowak | B23K 26/26 |
| | | | | 219/121.64 |
| 2012/0160815 | A1 * | 6/2012 | Hayashimoto | B23K 26/32 |
| | | | | 219/121.64 |
| 2013/0087540 | A1 * | 4/2013 | Gu | B23K 26/3584 |
| | | | | 219/121.64 |
| 2013/0309000 | A1 * | 11/2013 | Lin | B23K 26/0652 |
| | | | | 219/121.64 |
| 2014/0003860 | A1 * | 1/2014 | Evangelista | B23K 9/235 |
| | | | | 219/121.64 |
| 2014/0008333 | A1 * | 1/2014 | Lin | B23K 26/1423 |
| | | | | 219/121.64 |
| 2014/0076870 | A1 * | 3/2014 | Hirano | B23K 26/38 |
| | | | | 219/121.75 |
| 2014/0144893 | A1 * | 5/2014 | Yang | B23K 9/0026 |
| | | | | 219/137 R |
| 2014/0175069 | A1 * | 6/2014 | Yano | B23K 26/262 |
| | | | | 219/121.64 |
| 2014/0291304 | A1 * | 10/2014 | Mudd, II | B23K 26/323 |
| | | | | 219/121.64 |
| 2015/0336212 | A1 * | 11/2015 | Hisada | B23K 26/082 |
| | | | | 219/121.64 |
| 2016/0016261 | A1 * | 1/2016 | Mudd, II | B23K 26/242 |
| | | | | 219/121.64 |
| 2016/0031042 | A1 * | 2/2016 | Gietzelt | B23K 26/323 |
| | | | | 219/121.64 |
| 2016/0045970 | A1 * | 2/2016 | Garcia | B23K 35/383 |
| | | | | 219/121.64 |
| 2016/0114428 | A1 * | 4/2016 | Wang | B23K 26/32 |
| | | | | 219/121.64 |
| 2016/0318127 | A1 * | 11/2016 | Gu | B23K 26/144 |
| 2016/0332256 | A1 * | 11/2016 | Gu | B23K 26/24 |
| 2017/0001261 | A1 * | 1/2017 | Fujiwara | B23K 26/0006 |
| 2017/0095886 | A1 * | 4/2017 | Gu | B23K 26/361 |
| 2017/0304943 | A1 * | 10/2017 | Tsukui | B23K 26/0608 |
| 2018/0065207 | A1 * | 3/2018 | Hammer | B23K 1/20 |
| 2018/0141158 | A1 * | 5/2018 | Yang | B23K 26/244 |
| 2018/0236600 | A1 * | 8/2018 | Vila I Ferrer | C22C 38/02 |
| 2018/0304405 | A1 * | 10/2018 | Yang | B23K 26/32 |
| 2019/0240780 | A1 | 8/2019 | Yang et al. | |
| 2019/0262942 | A1 * | 8/2019 | Haug | B23K 26/242 |
| 2019/0375046 | A1 * | 12/2019 | Grimm | B23K 26/0622 |
| 2020/0094350 | A1 * | 3/2020 | Pan | B23K 26/0876 |
| 2020/0316713 | A1 * | 10/2020 | Yang | B23K 26/22 |
| 2020/0353983 | A1 * | 11/2020 | Alvarez | B23K 35/24 |
| 2020/0384574 | A1 * | 12/2020 | Nishii | B23K 26/0676 |
| 2021/0053152 | A1 * | 2/2021 | Vierstraete | B23K 26/242 |

FOREIGN PATENT DOCUMENTS

| | | |
|---|---|---|
| JP | 2000-233289 A | 8/2000 |
| JP | 2002-219590 A | 8/2002 |
| JP | 2005-504641 A | 2/2005 |
| JP | 2013139039 A * | 7/2013 |
| JP | 2018-176229 A | 11/2018 |

(56) References Cited

FOREIGN PATENT DOCUMENTS

| WO | WO 00/66314    | 11/2000 |
| WO | WO 03/031111 A1 | 4/2003 |
| WO | 2018/010132 A1 | 1/2018 |

OTHER PUBLICATIONS

Japanese Office Action dated Feb. 7, 2023 in corresponding Japanese patent Application No. 2020-509388, with English Machine translation, 14 pages.
Chinese Rejection Decision dated Jan. 6, 2023 in corresponding Chinese patent Application No. 201980023855.7, with English translation of the cover page and English machine translation of the main body thereof, 26 pages.
Chinese Office Action issued May 11, 2023 in corresponding Chinese Patent Application No. 201980023855.7 (with English translation of the cover page and English machine translation of the mail body thereof), 28 pages.
Chinese Office Action issued Sep. 29, 2023 in Chinese Patent Application No. 201980023855.7 (with unedited computer-generated English translation), 23 pages.
Japanese Office Action dated Aug. 27, 2024 in corresponding Japanese Patent Application No. 2020-509388 with English Machine translation, 31 pages.

\* cited by examiner

WELDING METHOD AND WELDING APPARATUS

CROSS-REFERENCE TO RELATED APPLICATION(S)

This application is a continuation of International Application No. PCT/JP2019/014452, filed on Apr. 1, 2019 which claims the benefit of priority of the prior Japanese Patent Application No. 2018-069276, filed on Mar. 30, 2018, the entire contents of which are incorporated herein by reference.

BACKGROUND

The present disclosure relates to a welding method and a welding apparatus.

As a method for welding a workpiece made of a metallic material such as iron or copper, there is known laser welding. Laser welding is a welding method in which a welding part of the workpiece is irradiated with laser light so as to melt the welding part with the energy of the laser light. A liquid pool of the melted metallic material called a weld pool is formed in the welding part irradiated with the laser light, and the weld pool is solidified thereafter for performing welding.

There may be a case where lap welding is performed, in which two sheet members are stacked to form a workpiece and the sheet members are joined with each other by welding. In this case, if the sheet member is a plated sheet member having a plating layer formed on the surface of a base material, such as galvanized steel sheet, the plating layer evaporates into a gas when the steel members are melted. It occurs when the boiling point of the plating layer is lower than the melting point of the base material. The gas generated in such manner may disturb the weld pool and deteriorate flatness of the surface of the weld pool. Such deterioration in the flatness of the surface of the weld pool may be a cause for poor welding.

In order to overcome the issue of poor welding as described above, there is disclosed a technique (see Japanese Laid-open Patent Publication No. H07-155974, for example) in which: a protrusion is formed on a first plated steel sheet; an apex of the protrusion is abutted against a surface of a second plated steel sheet when stacking the first and second plated steel sheet; and the first plated steel sheet is irradiated with a laser beam from an opposite side of the apex of the projection to weld the first and second plated steel sheets.

With the above-described technique, however, it is necessary to add a process for forming the protrusion on one of the plated steel sheets.

SUMMARY

There is a need for providing a welding method and a welding apparatus capable of suppressing occurrence of poor welding when performing lap welding of plated sheet members.

According to an embodiment, a welding method includes: forming a workpiece by stacking plated sheet members having a plating layer formed on a surface of a base material; disposing the workpiece in an area to be irradiated with laser light; irradiating a surface of the workpiece with a plurality of beams by dispersing positions such that centers of the beams do not overlap with each other within a prescribed area on the surface; while continuing the irradiation, relatively moving the beams and the workpiece and sweeping the beams on the workpiece so as to melt an irradiated part of the workpiece for performing welding; and setting a distance between the beams to be emitted such that weld pools formed in the workpiece by irradiation of each of the beams overlap with each other.

According to an embodiment, a welding apparatus includes: a laser device; a beam shaper that divides laser light output from the laser device into a plurality of beams; and an optical head that irradiates a workpiece with the beams to melt an irradiated part of the workpiece for performing welding. Further, the workpiece is formed by stacking plated sheet members having a plating layer formed on a surface of a base material, the optical head is configured such that the beams and the workpiece are relatively movable, the optical head sweeping the beams on the workpiece for performing the melting to perform welding, and the beam shaper divides the laser light such that the optical head is able to irradiate a surface of the workpiece with the beams by dispersing positions so that centers of the beams do not overlap with each other within a prescribed area on the surface.

DETAILED DESCRIPTION

Figure 1:
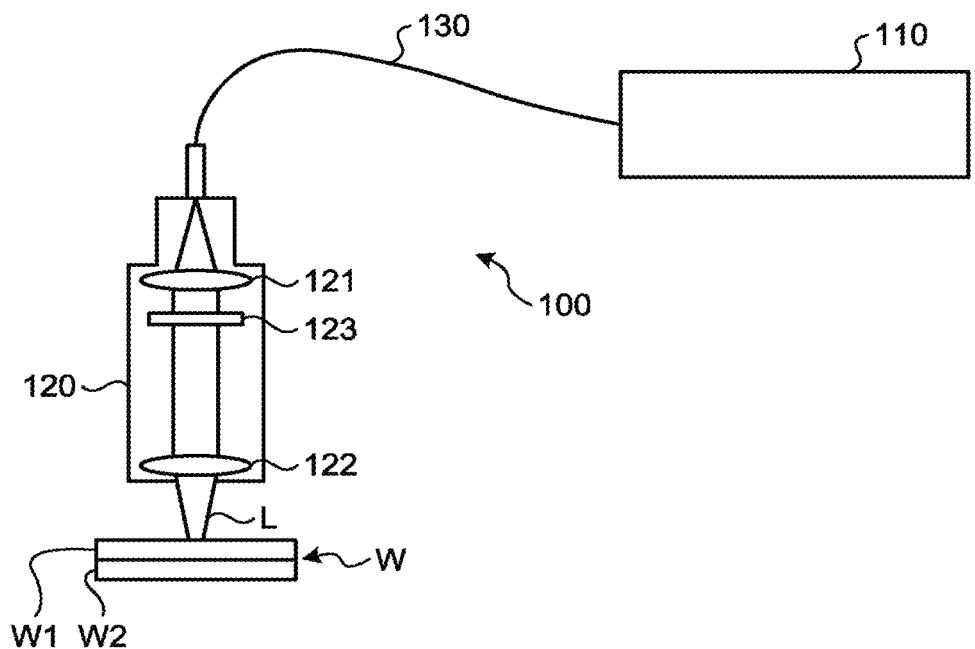
FIG. 1 is a schematic diagram illustrating a schematic configuration of a laser welding apparatus according to a first embodiment.

Hereinafter, embodiments of the present disclosure will be described in detail by referring to the accompanying drawings. It is to be noted that the present disclosure is not limited to the embodiments described hereinafter. Furthermore, in the drawings, same reference signs are applied to the same or corresponding elements as appropriate.

First Embodiment

FIG. 1 is a schematic diagram illustrating a schematic configuration of a laser welding apparatus according to the first embodiment. A laser welding apparatus 100 includes a laser device 110, an optical head 120, and an optical fiber 130 that connects the laser device 110 and the optical head 120. Furthermore, a workpiece W is formed by stacking two galvanized steel sheets W1 and W2 that are plated sheet members.

The laser device 110 is configured to be able to output laser light with the power of several kW, for example. For example, the laser device 110 may include a plurality of semiconductor laser elements on the inside thereof, such elements as to be able to output multimode laser light of several kW as the total output of the semiconductor laser elements. Furthermore, the laser device 110 may include various kinds of laser light sources such as a fiber laser, a YAG laser, and a disk laser. The optical fiber 130 guides the laser light output from the laser device 110 to be input to the optical head 120.

The optical head 120 is an optical device for emitting laser light input from the laser device 110 toward the workpiece W. The optical head 120 includes a collimating lens 121 and a condenser lens 122. The collimating lens 121 is an optical system for making the input laser light into collimated light. The condenser lens 122 is an optical system for collecting the collimated laser light and emitting it as laser light L to the workpiece W.

The optical head 120 is configured to be able to change the relative position with respect to the workpiece W in order to sweep the laser light L while irradiating the workpiece W with the laser light L. Methods for changing the relative position with respect to the workpiece W include moving the optical head 120 itself, moving the workpiece W, and the like. That is, the optical head 120 may be configured to be able to sweep the laser light L for the fixed workpiece W. Alternatively, the irradiating position of the laser light L from the optical head 120 may be fixed, and the workpiece W may be held to be movable with respect to the fixed laser light L.

Figure 2:
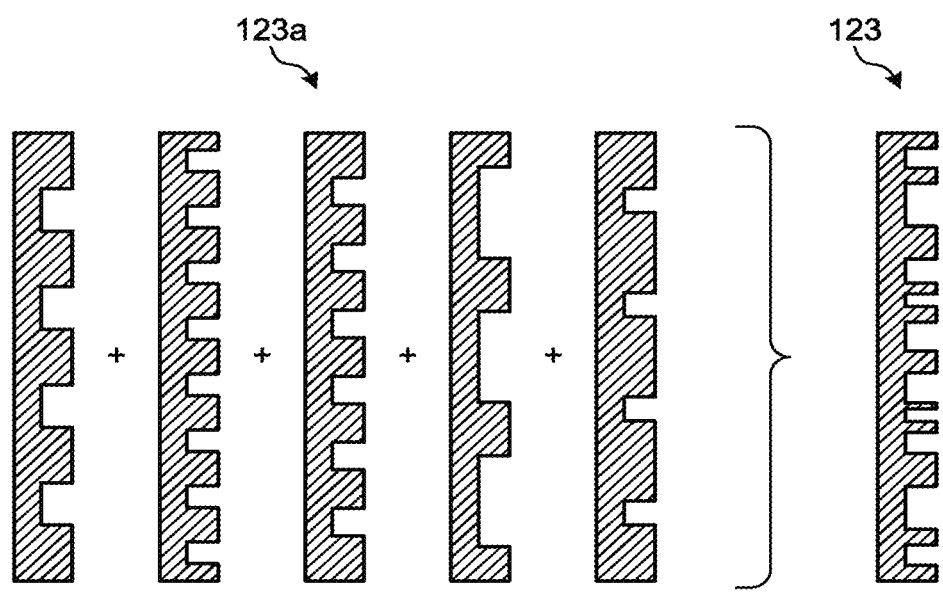
FIG. 2 is a schematic diagram for describing a diffractive optical element.

The optical head 120 includes a diffractive optical element 123 as a beam shaper disposed between the collimating lens 121 and the condenser lens 122. The diffractive optical element 123 herein is, as conceptually illustrated in FIG. 2, an element in which a plurality of diffraction gratings 123a of different periods are integrated. The diffractive optical element 123 is capable of shaping a beam profile by bending or superposing the input laser light toward directions affected by each of the diffraction gratings.

The diffractive optical element 123 divides the laser light input from the collimating lens 121 into a plurality of beams. Specifically, the diffractive optical element 123 divides the laser light such that the optical head 120 is able to irradiate the surface of the workpiece W with a plurality of beams by dispersing positions so that centers of the beams do not overlap with each other within a prescribed area on the surface. While described herein is a case where the diffractive optical element 123 is configured to divide the laser light input from the collimating lens 121 into a plurality of beams of equivalent peak powers, the powers of the beams may be different from each other.

Figure 3:
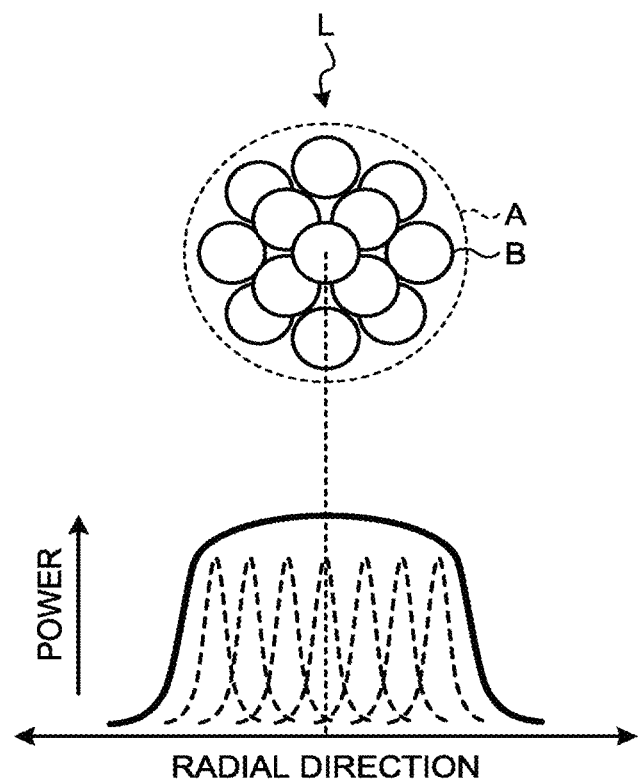
FIG. 3 is a schematic diagram for describing a plurality of beams.

FIG. 3 is a schematic diagram for describing a plurality of beams. The laser light L includes a plurality of beams B divided by the diffractive optical element 123. The diameter of a circle representing a beam B is the beam diameter. A circular area A is a prescribed area on the surface of the workpiece W. The area A of the workpiece W is irradiated with a plurality of (thirteen in the embodiment) beams B with positions thereof being dispersed such that the centers thereof do not overlap with each other within the area A. The area A is in a shape corresponding to an outer contour shape of layout of the beams B. Furthermore, the two neighboring beams B partially overlap with each other. Each of the beams B, as illustrated with a broken line, has a Gaussian power distribution, for example, in a radial direction of a beam cross-section thereof. However, when the power distributions of the whole beams B are superposed, there is generated a flat-top power distribution having no prominent sharp peak as illustrated in FIG. 3.

Note that the power distribution of the beam B is not limited to the Gaussian shape. Furthermore, the beam diameter of the beam B is defined as a diameter of an area including a peak and having an intensity equal to or larger than $1/e^2$ of a peak intensity. In a case of a beam not in a circular shape, length of the area having an intensity equal to or larger than $1/e^2$ of a peak intensity in the vertical direction with respect to a sweeping direction is defined as the beam diameter in the current description.

In a case of performing welding by using the laser welding apparatus 100, first, the workpiece W is disposed in an area to be irradiated with the laser light L. Subsequently, while irradiating the workpiece W with the laser light L including the beams B divided by the diffractive optical element 123, the laser light L and the workpiece W are relatively moved to sweep the laser light L so as to melt and weld the part irradiated with the laser light L in the workpiece W.

Described herein is a state of welding where the laser light emitted to the surface of the workpiece W melts the workpiece W at the time of welding. First, for comparison, there is described a case where the laser light emitted to the surface of the workpiece W is laser light L10 configured with a single beam B. As described above, the single beam B is a Gaussian beam exhibiting a Gaussian power distribution in the radial direction of the beam cross-section, for example.

Figure 4:
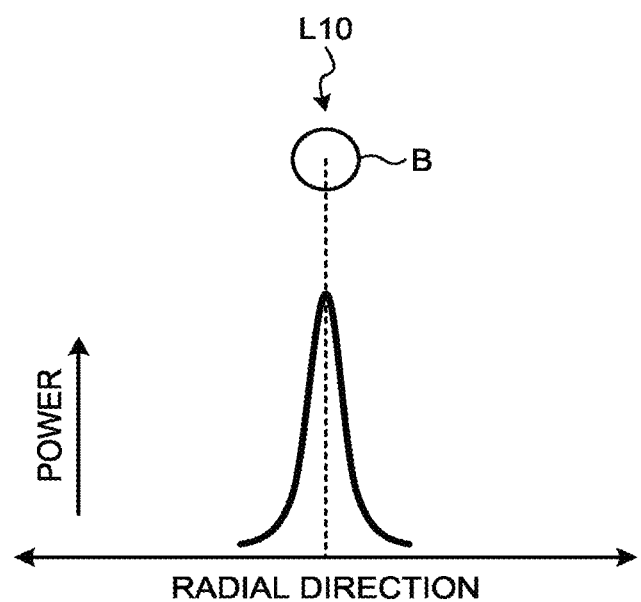
FIG. 4 is a schematic diagram for describing laser light configured with a single Gaussian beam.
Figure 5:
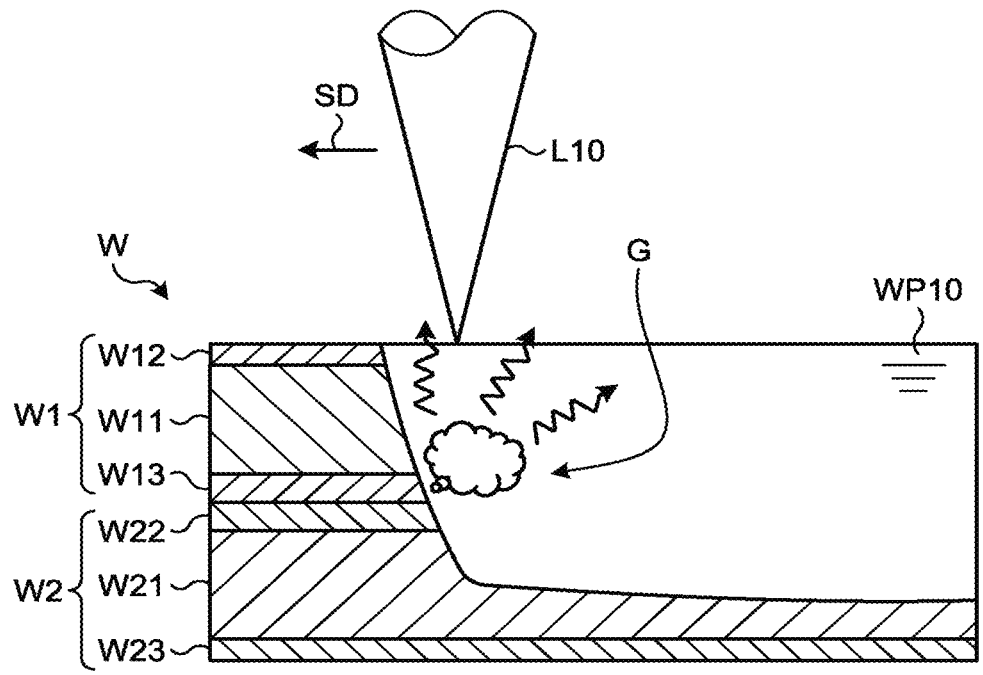
FIG. 5 is a schematic diagram for describing a state where the laser light of FIG. 4 melts a workpiece.

FIG. 5 is a schematic diagram for describing a state where the laser light L10 of FIG. 4 melts the workpiece W, which is a sectional view when viewed from the direction vertical to a sweeping direction SD of the laser light L10.

The workpiece W is formed by stacking the two galvanized steel sheets W1 and W2. The galvanized steel sheet W1 is acquired by forming galvanized layers W12 and W13 on respective surfaces on both sides of a steel sheet W11 as a base material. The galvanized steel sheet W2 is acquired by forming galvanized layers W22 and W23 on respective surfaces on both sides of a steel sheet W21 as a base material. The galvanized layers W13 and W22 are located on the inner side of the workpiece W.

When the laser light L10 is emitted to the surface of the workpiece W and swept to the sweeping direction SD, the laser light L10 melts the workpiece W and a weld pool WP10 is formed. Note here that the laser light L10 is configured with a single beam B as a Gaussian beam, and the power distribution thereof has a relatively sharp peak. Thus, when the laser light L10 is emitted, there is an abrupt temperature increase in a relatively narrow area on the surface of the workpiece W immediately thereafter to cause melting, thereby forming the weld pool WP10 such as to be deepened abruptly. Therefore, the galvanized layers W13, W22 that are sandwiched between the steel sheets W11, W21 and have the boiling point lower than the melting point of the steel sheets W11, W21 evaporate and gasify abruptly in a short time or explosively in some cases. The generated gas G may disturb the weld pool WP10 and deteriorate flatness of the surface of the weld pool WP10. Such deterioration of the flatness of the surface of the weld pool WP10 causes poor welding such as having abnormal shapes of weld beads. Furthermore, since melting occurs abruptly in a relatively small area, the surface area size of the weld pool WP10 is relatively small with respective to the amount of abruptly generated gas G. Therefore, there may be a case where the gas G is not sufficiently discharged to outside from the surface of the weld pool WP10, which causes poor welding such as having air bubbles remained after the weld pool WP10 is solidified.

Figure 6:
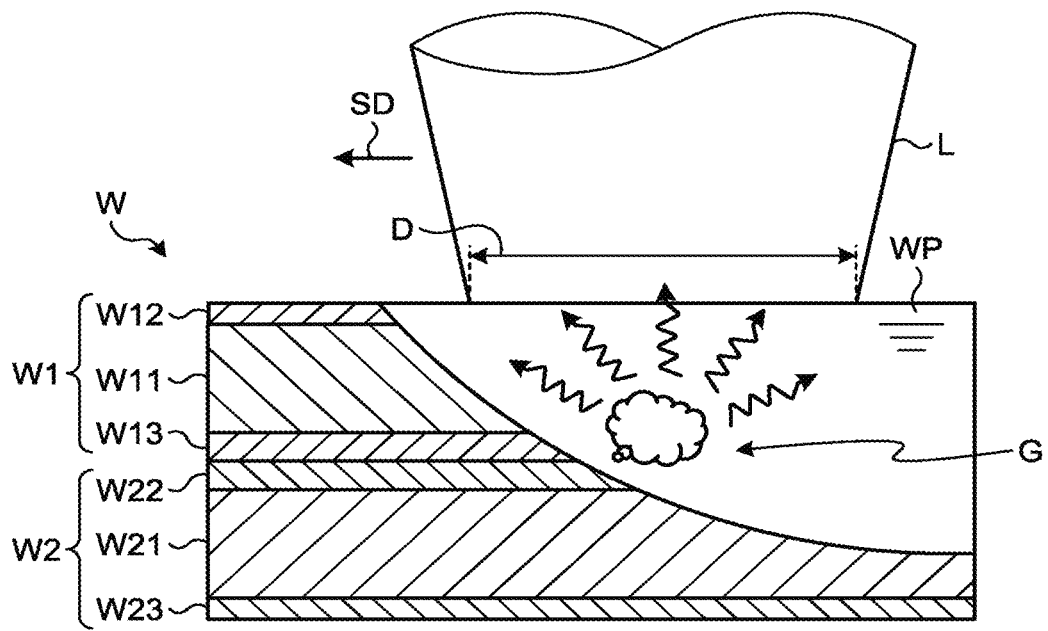
FIG. 6 is a schematic diagram for describing a state where the laser light of FIG. 3 melts a workpiece.

Meanwhile, FIG. 6 is a schematic diagram for describing a state where the laser light L of FIG. 3 melts the workpiece W, which is a sectional view when viewed from the direction vertical to the sweeping direction SD of the laser light L.

When the laser light L is emitted to the surface of the workpiece W and swept to the sweeping direction SD, the laser light L melts the workpiece W, thereby forming a weld pool WP. Note here that the laser light L is configured with a plurality of beams B, and each of the beams B is emitted to an area A of the workpiece W by being dispersed within the relatively wide area A. Therefore, the diameter D of the laser light L becomes relatively large by reflecting the dispersed irradiating positions of the beams B. As described above, when the power distributions of the whole beams B are superposed, there is generated a flat-top power distribution having no prominent sharp peak as illustrated in FIG. 3. Thus, when the laser light L is emitted, there is a temperature increase in the relatively wide area A of the surface of the workpiece W to cause melting, thereby forming the weld pool WP such as to be deepened relatively slowly. Therefore, the galvanized layers W13 and W22 evaporate and gasify not abruptly but gradually. As a result, the generated gas G hardly disturbs the weld pool WP, so that deterioration in the flatness of the surface of the weld pool WP is suppressed as well. Furthermore, melting gradually proceeds in the relatively wide area. Thereby, a discharging pathway of the gas G is secured such that the gradually generated gas G is sufficiently discharged from the surface of the weld pool WP with a relatively large surface area size so that air bubbles are not likely to remain after the weld pool WP is solidified. As a result, it is possible to suppress occurrence of poor welding.

In order to suppress poor welding more efficiently, it is preferable to disperse the irradiating positions of the beams B such that the gas can be discharged gradually and sufficiently from the surface of the weld pool WP. In particular, the beams B are preferable to be emitted by dispersing the irradiating positions such that welding defects caused due to the gas does not exceed an allowable degree. Note here that the allowable range means a range that is allowed according to requirement specifications or the like for welding, for example.

In order to suppress poor welding more efficiently, it is preferable to set the number of beams B, the peak power, and layout of the irradiating positions and to set the shape of the area A according to the characteristics (type of the material, thickness of the base material, thickness of the plating layers, and the like) of the workpiece W. While it is possible to suppress poor welding more efficiently by setting at least one of those items, poor welding can be suppressed still more efficiently by combining and setting two or more of those as appropriate.

Figure 7:
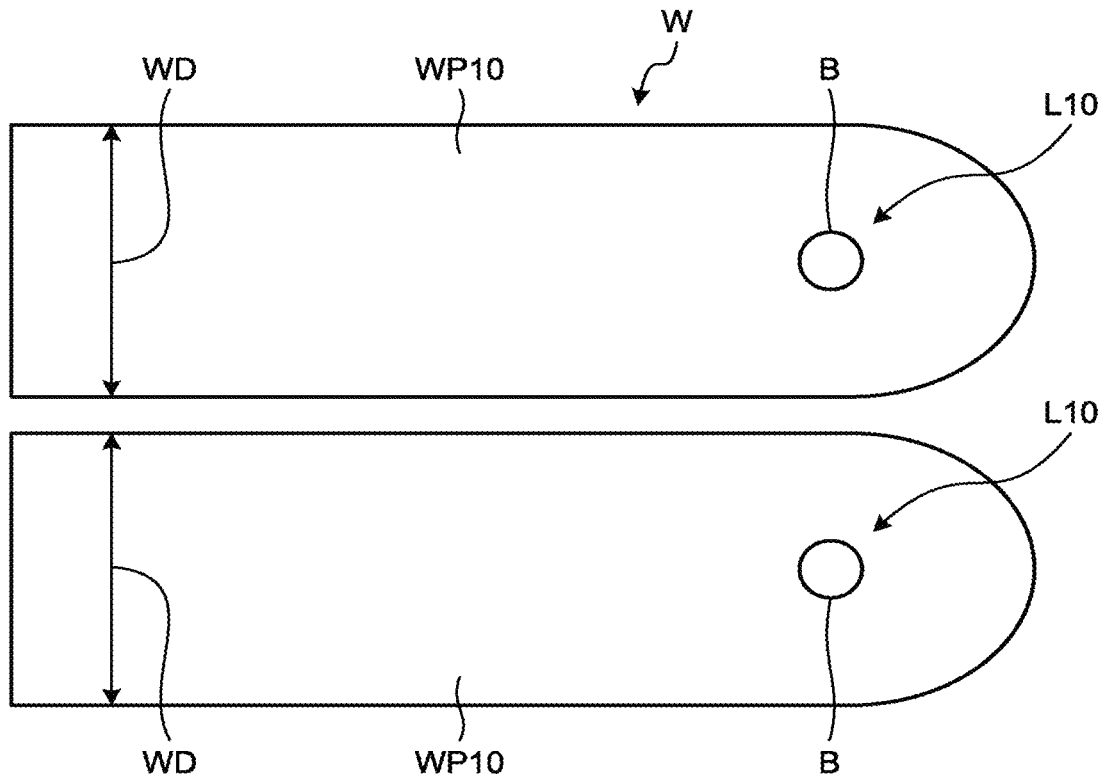
FIG. 7 is a schematic diagram for describing a weld pool formed by the laser light.
Figure 8:
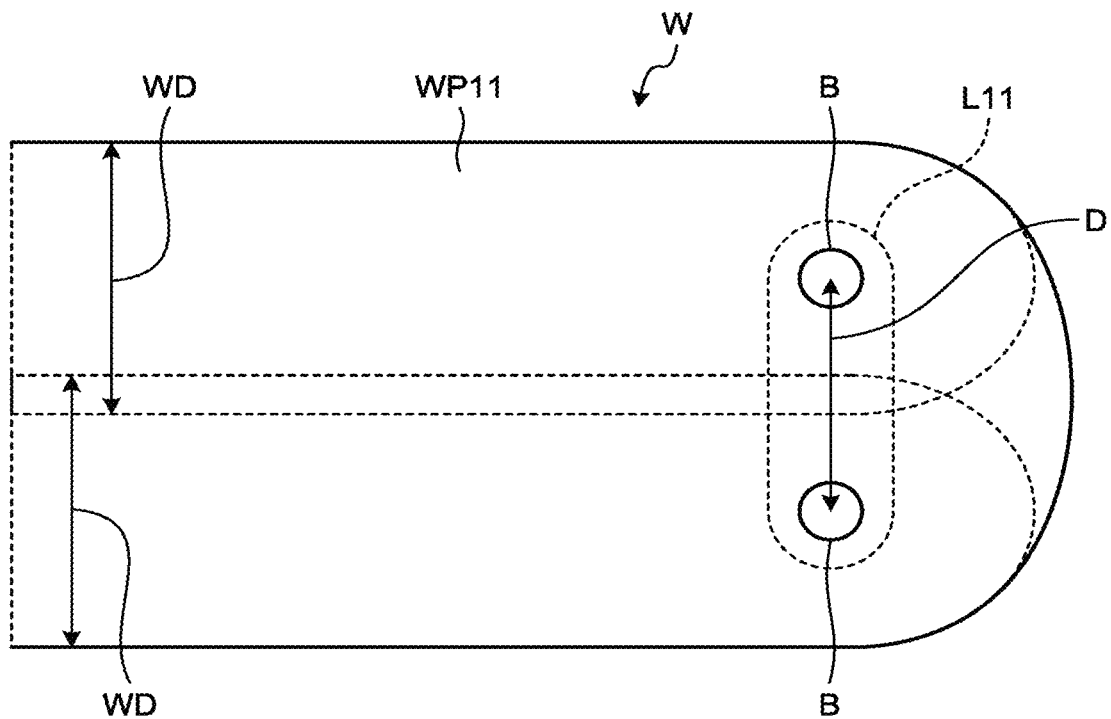
FIG. 8 is a schematic diagram for describing a weld pool formed by the laser light.

The weld pool formed in the workpiece W will be described further. FIGS. 7 and 8 are schematic diagrams for describing the weld pool formed by the laser light L. Illustrated in FIG. 7 is a case where the laser light L10 configured with a single beam B as in FIG. 4 is emitted. In this case, when each laser light L10 is swept, the weld pool WP10 with a width WD is formed, respectively. However, since an isolation distance between two rays of the laser light L10 (isolation distance between the centers of the beams B) is larger than the width WD, the weld pools WP10 formed in the workpiece W by irradiation of each of the beams B do not overlap with each other.

Meanwhile, illustrated in FIG. 8 is a case where laser light L11 including two beams B is emitted. In this case, since an isolation distance D between the two beams B is smaller than the width WD, the weld pools formed in the workpiece W by irradiation of each of the beams B overlap with each other, thereby forming a weld pool WP11 with a wider width than the width WD. In FIG. 8, broken lines virtually illustrate contours of the weld pools formed in the workpiece by irradiation of the beams B. As described, when the beams B are emitted such that the weld pools formed in the workpiece by irradiation of the beams B overlap with each other, a weld pool with a wide area size as a whole can be formed so that it is preferable in terms of discharging the gas and possible to suppress or prevent bumping and the like. Therefore, the distance between the beams B to be emitted is set such that the weld pools formed in the workpiece W by irradiation of each of the beams B overlap with each other.

Furthermore, the power distributions of the beams B are preferable to be in a sharp form to some extent. When the power distributions of the beams B are in a sharp form to some extent, a penetration depth when melting the workpiece W can be deepened so that it is possible to suppress occurrence of poor welding. Furthermore, by sharpening each of the beams B and having the weld pools overlapped with each other, it is possible to form a deep and wide weld pool so that preferable welding can be achieved. Using the beam diameter as an indicator of sharpness of the beam B, the beam diameter of each of the beams B is preferable to be equal to or less than 600 μm. Furthermore, the width WD of the weld pools is about six times the individual beam diameter, for example, so that the isolation distance between the beams B is preferable to be equal to or less than six times the beam diameter. Thus, the isolation distance between the beams B is preferable to be equal to or less than 3600 μm, for example. Note that when the beam B is in a sharp shape, the power for achieving the same penetration depth can be reduced and the processing speed can be increased as well. Therefore, it is possible to reduce the power consumption of the laser welding apparatus 100 and to improve the processing efficiency.

Note that designing the beam diameter is possible by appropriately setting the characteristics of the laser device 110, the optical head 120, and the optical fiber 130 to be used. For example, it can be designed by setting the beam diameter of the laser light input to the optical head 120 from the optical fiber 130 and setting the optical systems such as the diffractive optical element 123, the collimating lenses 121, the condenser lens 122 and the like.

FIG. 9A to FIG. 9H are schematic diagrams for describing examples where the diffractive optical element 123 divides laser light into a plurality of beams. It is to be assumed that the sweeping direction is directed toward the upper side when facing the drawings. In the example illustrated in FIG. 9A, laser light L1 emitted to the workpiece W includes eight beams B1 each being in a Gaussian shape, for example, which are arranged in a ring-like form within a circular area A1 as a prescribed area on the surface of the workpiece W to be emitted to the area A1. In the example illustrated in FIG. 9B, laser light L2 emitted to the workpiece W includes eight beams B2 each being in a Gaussian shape, for example, which are arranged in a square form within a square area A2 as a prescribed area on the surface of the workpiece W to be emitted to the area A2. In the example illustrated in FIG. 9C, laser light L3 emitted to the workpiece W includes six beams B3 each being in a Gaussian shape, for example, which are arranged in a triangle form within a triangular area A3 as a prescribed area on the surface of the workpiece W to be emitted to the area A3.

Figure 9A:
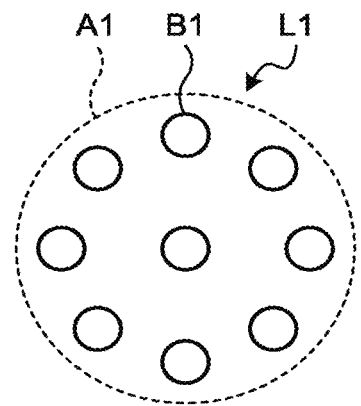
FIG. 9A is a schematic diagram for describing an example where a diffractive optical element divides laser light into a plurality of beams.
Figure 9B:
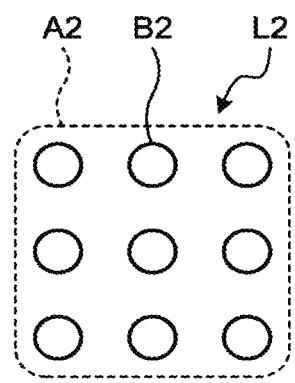
FIG. 9B is a schematic diagram for describing an example where a diffractive optical element divides laser light into a plurality of beams.
Figure 9C:
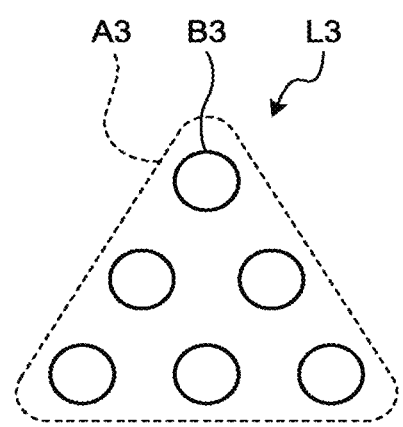
FIG. 9C is a schematic diagram for describing an example where a diffractive optical element divides laser light into a plurality of beams.
Figure 9D:
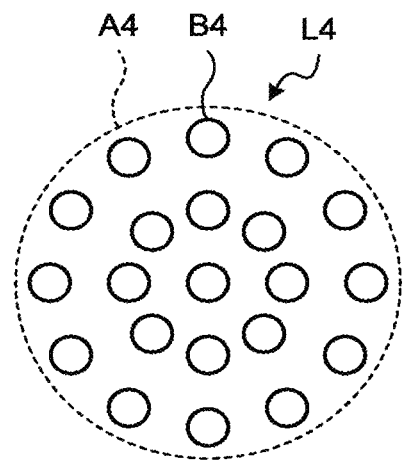
FIG. 9D is a schematic diagram for describing an example where a diffractive optical element divides laser light into a plurality of beams.

In the example illustrated in FIG. 9D, laser light L4 emitted to the workpiece W includes twenty-one beams B4 each being in a Gaussian shape, for example, which are arranged to form a circular outer contour within a circular area A4 as a prescribed area on the surface of the workpiece W to be emitted to the area A4. In the example illustrated in FIG. 9E, laser light L5 emitted to the workpiece W includes thirteen beams B5 each being in a Gaussian shape, for example, twelve of which are arranged in a ring-like form while one of which is arranged in the center thereof within a circular area A5 as a prescribed area on the surface of the workpiece W to be emitted to the area A5.

Figure 9E:
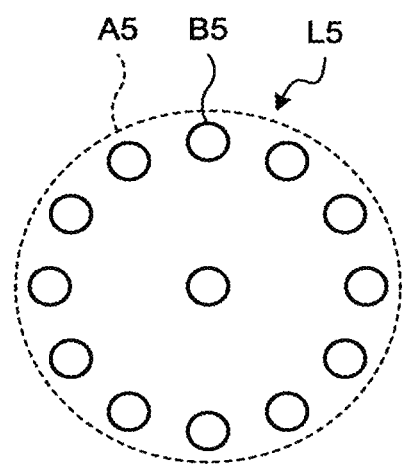
FIG. 9E is a schematic diagram for describing an example where a diffractive optical element divides laser light into a plurality of beams.
Figure 9F:
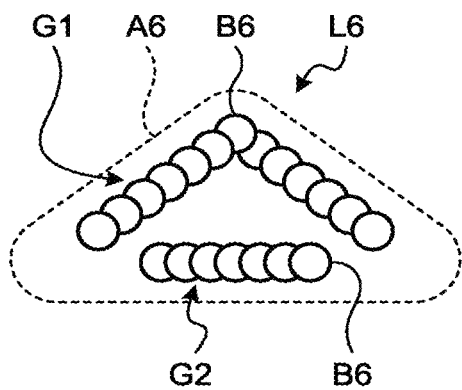
FIG. 9F is a schematic diagram for describing an example where a diffractive optical element divides laser light into a plurality of beams.

In the example illustrated in FIG. 9F, laser light L6 emitted to the workpiece W includes twenty beams B6 each being in a Gaussian shape. Each of the beams B6 belongs to either a beam group G1 or a beam group G2. The beam group G1 forms a mountain-like shape with its top facing toward the sweeping direction SD, while the beam group G2 is located on the rear side of the beam group G1 and forms a straight line. The beam groups G1 and G2 are arranged within a triangular area A6 as a prescribed area on the surface of the workpiece W to be emitted to the area A6.

Figure 9G:
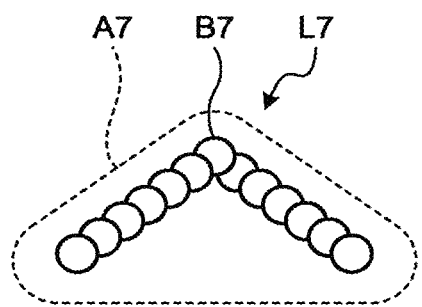
FIG. 9G is a schematic diagram for describing an example where a diffractive optical element divides laser light into a plurality of beams.

In the example illustrated in FIG. 9G, laser light L7 emitted to the workpiece W includes thirteen beams B7 each being in a Gaussian shape, for example. The beams B7 form a mountain-like shape similar to that of the beam group G1 of FIG. 9F. The beams B7 are arranged within a triangular area A7 as a prescribed area on the surface of the workpiece W to be emitted to the area A7.

Figure 9H:
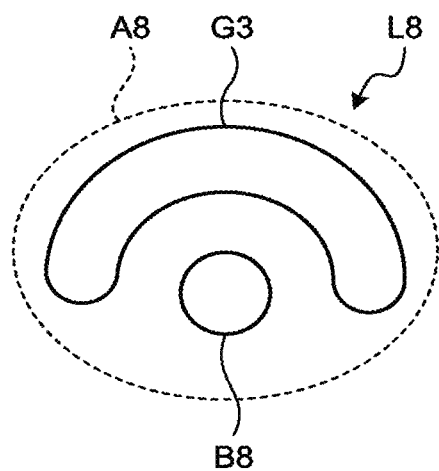
FIG. 9H is a schematic diagram for describing an example where a diffractive optical element divides laser light into a plurality of beams.

In the example illustrated in FIG. 9H, laser light L8 emitted to the workpiece W includes a beam B8 in a Gaussian shape, for example, and a beam group G3. The beam group G3 includes seven beams each being in a Gaussian shape, for example, which are arranged at equivalent intervals to form a semicircular arc shape. The beam B8 is located in the vicinity of the center of the semicircular arc of the beam group G3 by being arranged within an area A8 as a prescribed area on the surface of the workpiece W to be emitted to the area A8.

In any of the diagrams from FIG. 9A to FIG. 9H, the prescribed area is in a shape corresponding to the outer contour of the shape formed by the beams arranged dispersedly.

Figure 10:
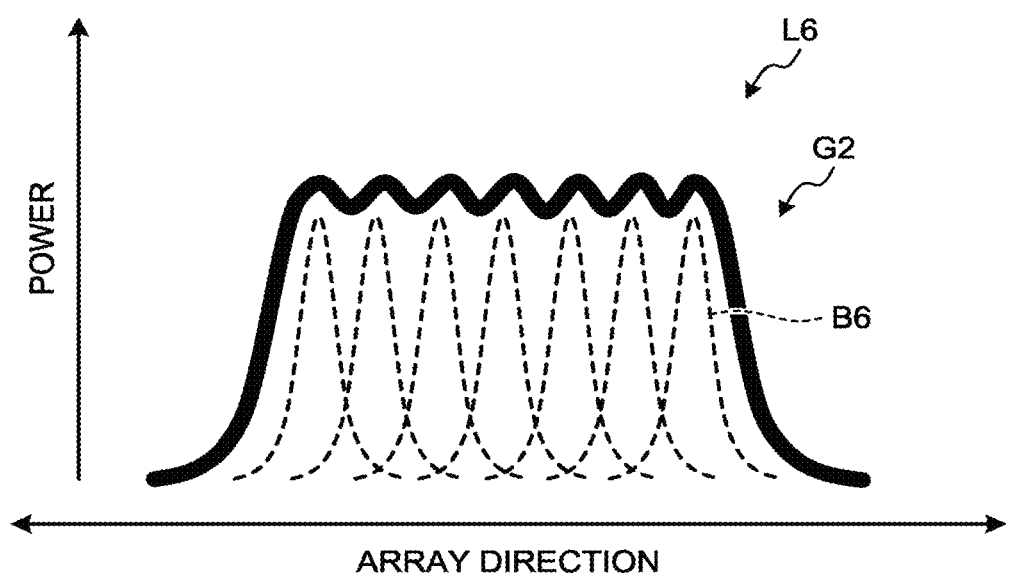
FIG. 10 is a schematic diagram for describing an example of overlap of beams.

FIG. 10 is a schematic diagram for describing an example of overlap of the beams B6 in the beam group G1 of the laser light L6 illustrated in FIG. 9F. In the example illustrated in FIG. 10, the powers of the beam group G2 are uneven in the layout direction of the beams B6. The layout, the beam shape, and the like may be set so that such unevenness falls within an allowable amplitude according to a desired welding quality and the like.

In any of the diagrams of FIG. 3 and FIG. 9A to FIG. 9H, it is important to set the peak powers of individual beams so as not to abruptly melt the workpiece immediately after irradiation thereof as illustrated in FIG. 5.

Furthermore, in FIG. 3, FIGS. 9A and 9C to 9H, the beams are arranged such that the widths of the shapes of the areas A, A1, and A3 to A8 in the direction orthogonal to the sweeping direction are gradually widened. Such layout of the beams allows a gradual increase in the surface area size and the depth of the weld pool WP in the workpiece W at the time of emitting the laser light, so that it is effective in order to suppress occurrence of poor welding. In FIGS. 9F, 9G, and 9H in particular, the layout of the beams exhibits high directivity for the sweeping direction and more beams are arranged on the front side of the sweeping direction. This makes it possible to perform welding efficiently. Meanwhile, the beams are isotropically arranged in FIG. 3, and FIGS. 9A, 9D, 9E, so that there is such an effect that the melting property for the workpiece W does not change even when the sweeping direction is arbitrarily changed.

The examples illustrated in FIGS. 9A to 9H can be achieved by appropriately designing the characteristics of the diffraction gratings configuring the diffractive optical element 123. Note that the powers of each of the beams included in the respective laser light L1 to laser light L8 illustrated in FIGS. 9A to 9H may be or may not be equivalent.

Comparative Example

As a comparative example, laser light configured with a single beam as illustrated in FIG. 4 was used to weld two galvanized steel sheets. The galvanized steel sheet was a steel sheet of 1 mm in thickness (GA) subjected to hot-dip galvannealing. A coating amount of galvanization was set as 45 g/m$^2$ for both surfaces. The laser light having a wavelength of 1070 nm, a power of 3000 W, and a beam diameter of 300 μm was used. Furthermore, the sweeping speed of the laser light was set as 20 m/s.

Figure 11A:
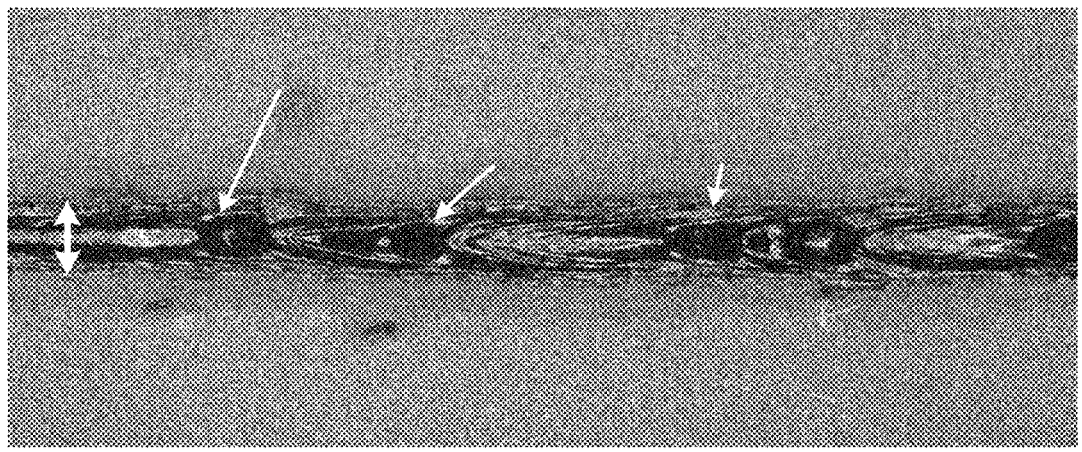
FIG. 11A is a picture of a surface of a galvanized steel sheet according to a comparative example.
Figure 11B:
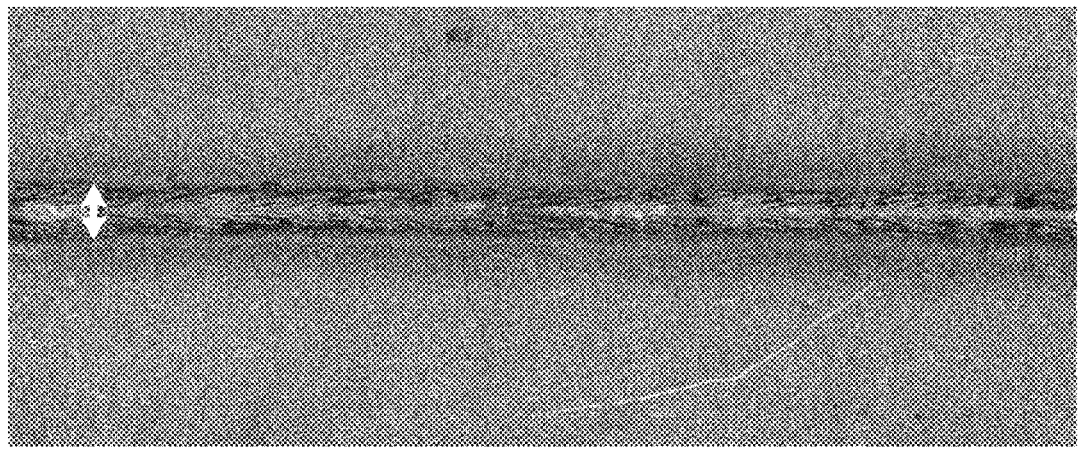
FIG. 11B is a picture of a back surface of the galvanized steel sheet acquired by the welding method according to the comparative example.
Figure 11C:
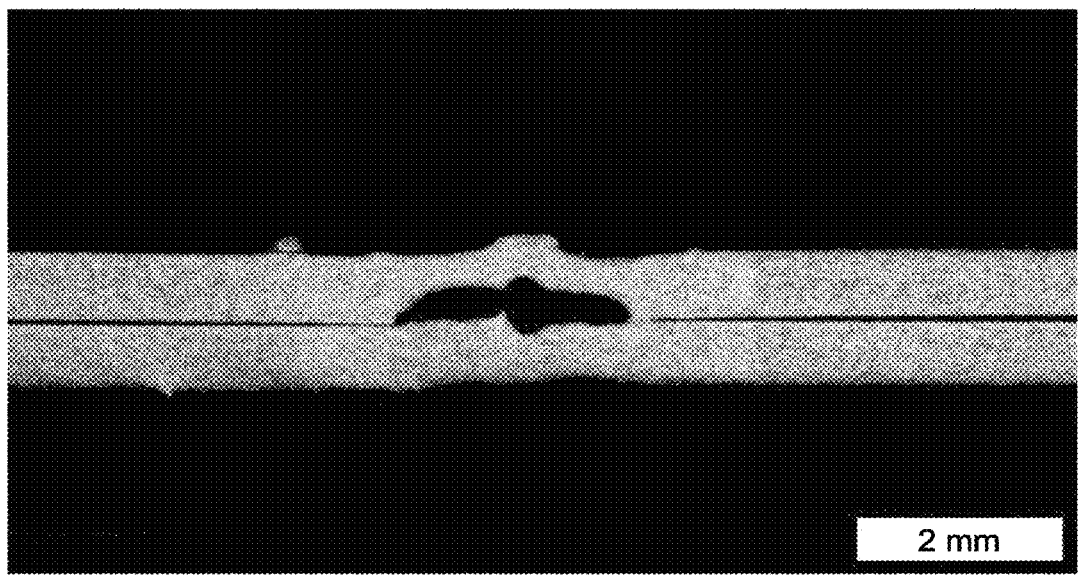
FIG. 11C is a picture of a sectional view of the galvanized steel sheet acquired by welding of the comparative example.

FIG. 11A is a picture of the surface of the galvanized steel sheet acquired by a welding method of the comparative example. FIG. 11B is a picture of the back surface of the galvanized steel sheet acquired by the welding method of the comparative example. FIG. 11C is a picture of a sectional view of the galvanized steel sheet acquired by the welding method of the comparative example. In FIG. 11A, a bead width indicated by a double-headed arrow was about 1800 μm. The bead width is considered to be substantially equivalent to the width of the weld pool. In FIG. 11A, there were holes opened in the parts indicated by arrows. Those are considered to be opened by part of the steel material scattered thereto. Furthermore, in FIG. 11B, a bead width indicated by a double-headed arrow was about 1100 μm. Furthermore, as in FIG. 11C, a void was formed in the section crossing the bead. The void is considered to be formed since the bead width is as narrow as about 1800 μm so that the width of the weld pool is narrow and the gas cannot be discharged.

First Example

As a first example, laser light configured with a plurality of beams as illustrated in FIG. 9H was used to weld two galvanized steel sheets. The galvanized steel sheets exhibit the same characteristics as those used in the comparative example. As for the laser light, the laser light configured with a single beam having a wavelength of 1070 nm, a power of 3000 W, and a beam diameter of 300 μm was shaped into the laser light as illustrated in FIG. 9H by using a diffractive optical element. Thus, the beam diameters of the individual beams configuring the beam B8 and the beam group G3 are all 300 μm. Furthermore, the diameter of the semicircular arc formed by the beam group G3 was set as about 700 μm. Furthermore, the power ratio of the power of the beam B8 and that of the beam group G3 was set to be 1:2. The isolation distance of the seven beams configuring the beam group G3 was set as about 180 μm. Furthermore, the sweeping speed of the laser light was set as 20 m/s.

Figure 12A:
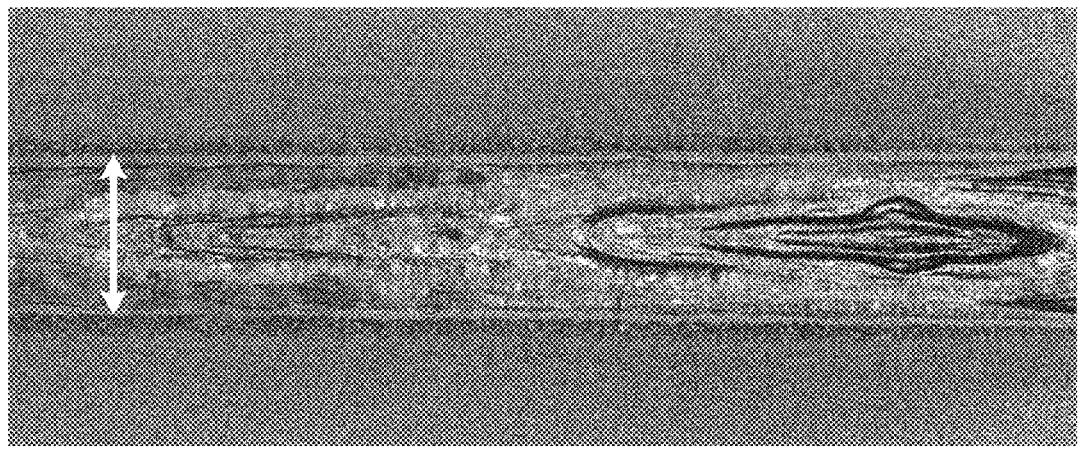
FIG. 12A is a picture of a surface of a galvanized steel sheet acquired by welding of a first example.
Figure 12B:
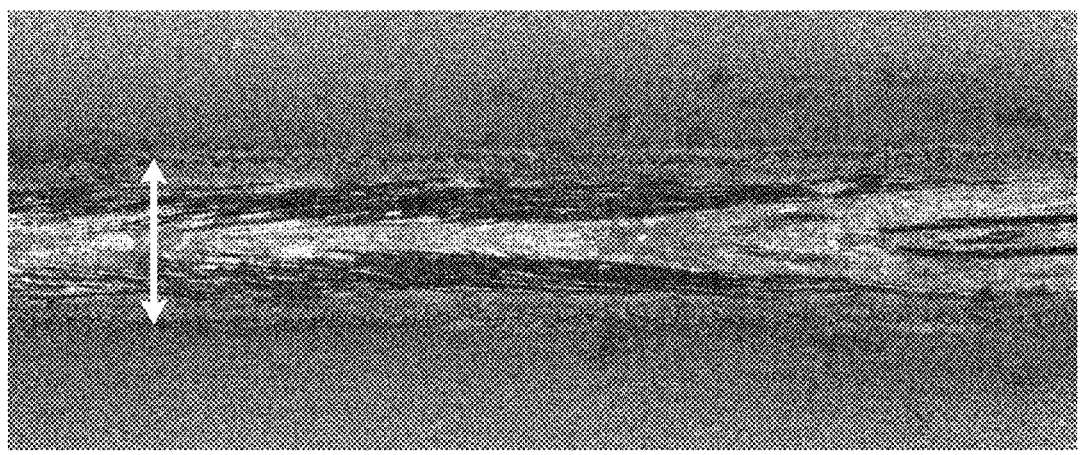
FIG. 12B is a picture of a back surface of the galvanized steel sheet acquired by welding of the first example.

FIG. 12A is a picture of the surface of the galvanized steel sheet acquired by a welding method of the first example. FIG. 12B is a picture of the back surface of the galvanized steel sheet acquired by the welding method of the first example. In FIG. 12A, a bead width indicated by a double-headed arrow was about 4200 μm. The bead width is considered to be substantially equivalent to the width of the weld pool. Furthermore, the bead width was about six times the diameter, about 700 μm, of the semicircular arc formed by the beam group G3. In FIG. 12A, there was no hole opened unlike the case of FIG. 11A. Furthermore, in FIG. 12B, a bead width indicated by a double-headed arrow was about 4000 μm.

Second Example

As a second example, two galvanized steel sheets exhibiting the same characteristics as those used in the first example were welded by using laser light different from that of the first example. As for the laser light, the laser light configured with a single beam having a wavelength of 1070 nm, a power of 5500 W, and a beam diameter of 300 μm was shaped into the laser light as illustrated in FIG. 9E by using a diffractive optical element. Thus, the beam diameters of the beams B5 are all 300 μm. Furthermore, the diameter of the circle formed by the twelve beams B5 arranged around the single beam B5 at the center was set as 600 μm. Furthermore, the power ratio of the power of the single beam B5 at the center and the total of the powers of the twelve beams B5 forming the circle was set to be 8:2. The isolation distance of the twelve beams B5 configuring the circle was set as about 157 μm. Furthermore, the sweeping speed of the laser light was set as 170 m/s.

Figure 13A:
FIG. 13A is a picture of a surface of a galvanized steel sheet acquired by welding of a second example.
Figure 13B:
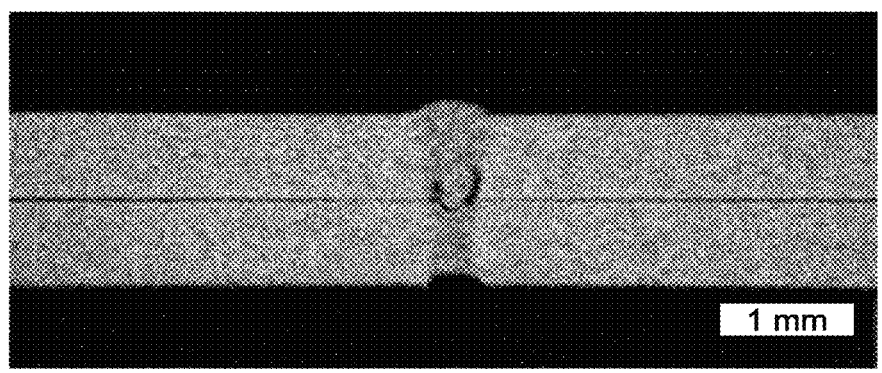
FIG. 13B is a picture of a sectional view of the galvanized steel sheet acquired by welding of the second example.

FIG. 13A is a picture of the surface of the galvanized steel sheet acquired by a welding method of the second example. FIG. 13B is a picture of a sectional view of the galvanized steel sheet acquired by the welding method of the second example. In FIG. 13A, there was no hole opened even though slight surface roughness was observed. Furthermore, as in FIG. 13B, while a void was formed in the section crossing the bead, the size thereof was extremely smaller than the void formed in the comparative example and a good result was acquired. Such void is a weld defect that does not exceed an allowable degree depending on the purpose of use.

Third Example

As a third example, laser light same as that of the first example was used to weld two galvanized steel sheets. The galvanized steel sheet was acquired by applying electrogalvanization (SECC) on a steel sheet of 1 mm in thickness. A coating amount of galvanization was set as 20 g/m$^2$ for both surfaces. The sweeping speed of the laser light was set as 20 m/s.

Figure 14A:
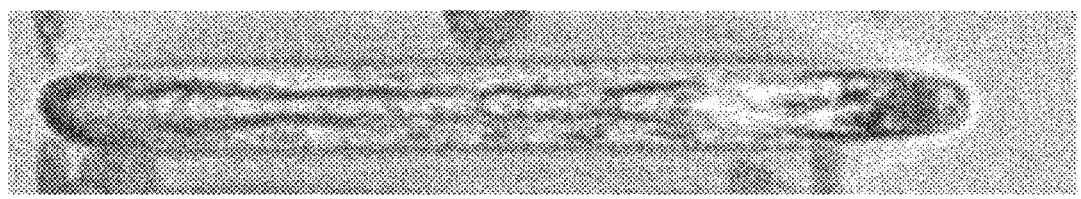
FIG. 14A is a picture of a surface of a galvanized steel sheet acquired by welding of a third example.
Figure 14B:
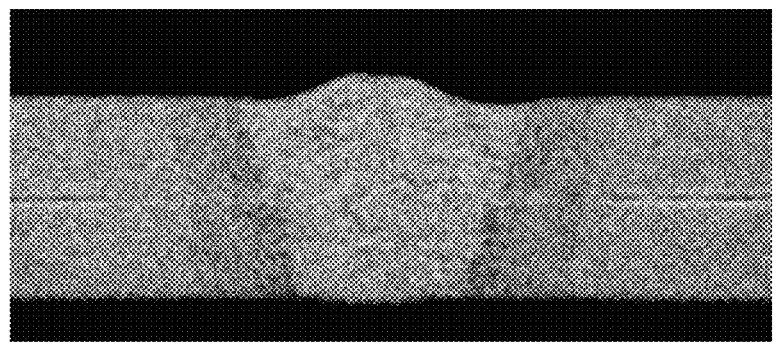
FIG. 14B is a picture of a sectional view of the galvanized steel sheet acquired by welding of the third example.

FIG. 14A is a picture of the surface of the galvanized steel sheet acquired by a welding method of the third example. FIG. 14B is a picture of a sectional view of the galvanized steel sheet acquired by the welding method of the third example. In FIG. 14A, there was no hole opened as in the case of FIG. 13A. Furthermore, as in FIG. 14B, no void was formed in the section crossing the bead and the bead surface was smooth, thereby acquiring a weld state of extremely fine quality.

Fourth Example

As a fourth example, laser light same as those of the first and third examples was used to weld two galvanized steel sheets. The galvanized steel sheet was a steel sheet (SGCC) of 1 mm in thickness subjected to hot-dip galvanization. A coating amount of galvanization was set as 60 g/m$^2$ for both surfaces. The sweeping speed of the laser light was set as 20 m/s.

Figure 15A:
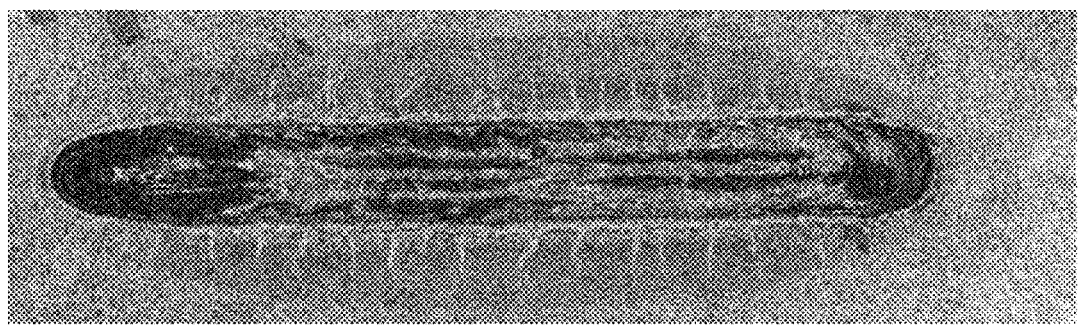
FIG. 15A is a picture of a surface of a galvanized steel sheet acquired by welding of a fourth example.
Figure 15B:
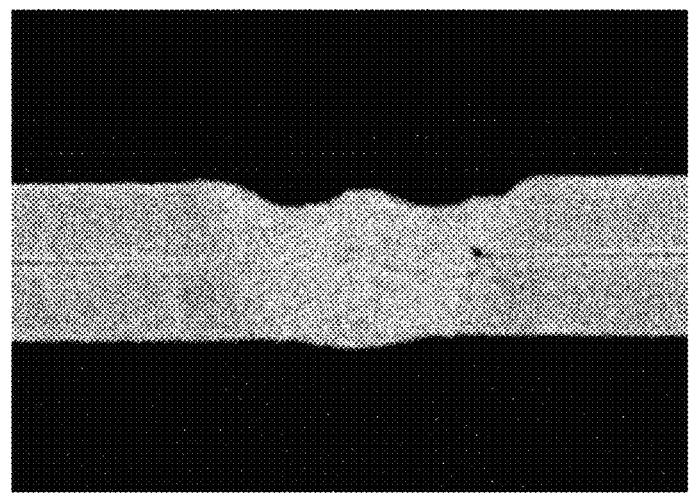
FIG. 15B is a picture of a sectional view of the galvanized steel sheet acquired by welding of the fourth example.

FIG. 15A is a picture of the surface of the galvanized steel sheet acquired by a welding method of the fourth example. FIG. 15B is a picture of a sectional view of the galvanized steel sheet acquired by the welding method of the fourth example. In FIG. 15A, there was no hole opened as in the case of FIG. 14A. Furthermore, as in FIG. 15B, no void was formed in the section crossing the bead, thereby acquiring a weld state of fine quality.

While there is a gap formed between the two galvanized steel plates other than the welding part as in FIG. 13B, FIG. 14B, and FIG. 15B, it is not particularly a problem in practical use.

Second Embodiment

Figure 16:
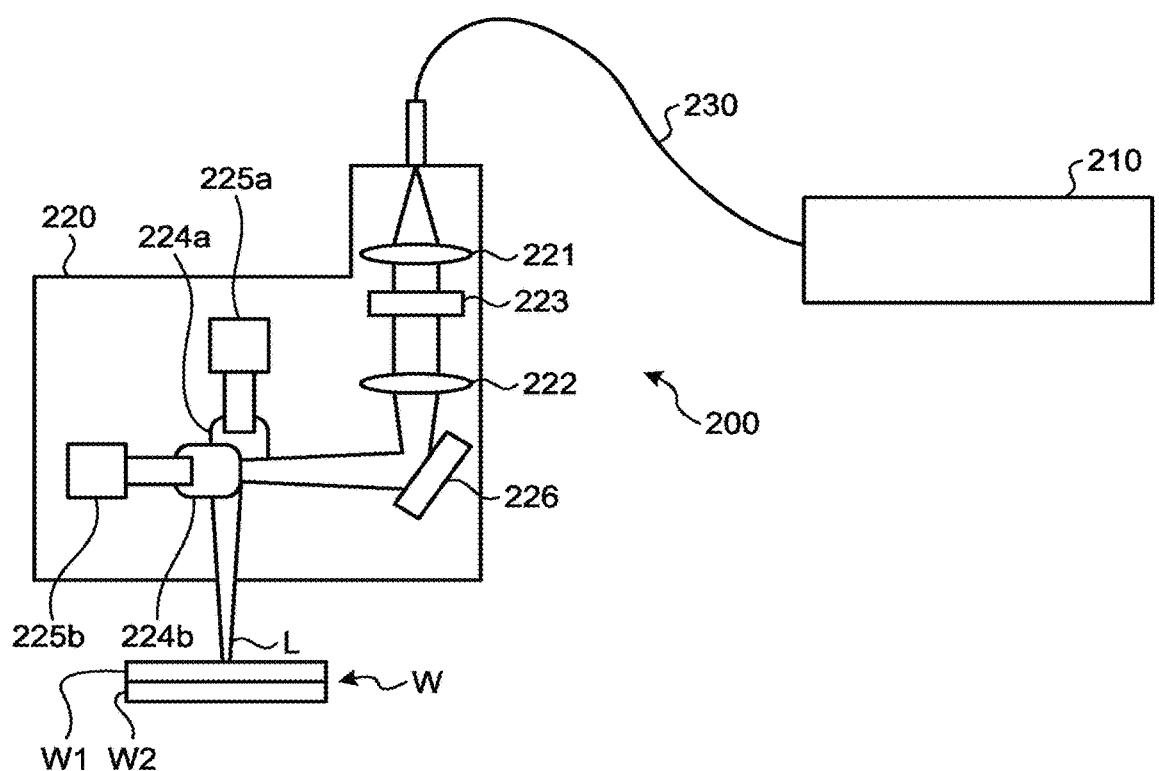
FIG. 16 is a schematic diagram illustrating a schematic configuration of a laser welding apparatus according to a second embodiment.

FIG. 16 is a schematic diagram illustrating a schematic configuration of a laser welding apparatus according to the second embodiment. A laser welding apparatus 200 irradiates the laser light L to the workpiece W for welding the workpiece W. The laser welding apparatus 200 achieves welding by the principle of action similar to that of the laser welding apparatus 100. Therefore, only the device configuration of the laser welding apparatus 200 will be described hereinafter.

the laser welding apparatus 200 includes a laser device 210, an optical head 220, and an optical fiber 230.

The laser device 210 is configured like the laser device 110 such as to be able to output the laser light with the power of several kW, for example. The optical fiber 230 guides the laser light output from the laser device 210 to be input to the optical head 220.

Like the optical head 120, the optical head 220 is an optical device for irradiating the workpiece W with laser light input from the laser device 210. The optical head 220 includes a collimating lens 221 and a condenser lens 222.

Furthermore, the optical head 220 includes a galvanoscanner disposed between the condenser lens 222 and the workpiece W. The galvanoscanner is a device capable of sweeping the laser light L by moving the irradiating position of the laser light L without moving the optical head 220 by controlling angles of two mirrors 224a and 224b. The laser welding apparatus 200 includes a mirror 226 for guiding the laser light L emitted from the condenser lens 222 to the galvanoscanner. Furthermore, the angles of the mirrors 224a and 224b of the galvanoscanner are changed by motors 225a and 225b, respectively.

The optical head 220 includes a diffractive optical element 223 as a beam shaper disposed between the collimating lens 221 and the condenser lens 222. Like the diffractive optical element 123, the diffractive optical element 223 divides the laser light input from the collimating lens 221 into a plurality of beams of equivalent peak powers. Specifically, the diffractive optical element 223 divides the laser light such that the optical head 220 is able to irradiate the surface of the workpiece W with a plurality of beams by dispersing positions so that centers of the beams do not overlap with each other within a prescribed area on the surface. Note that the diffractive optical element 223 is designed to divide the laser light into a plurality of beams as illustrated in FIG. 3 and FIG. 9A to FIG. 9H, for example. At this time, the distance between the beams to be emitted is set such that the weld pools formed in the workpiece W by irradiation of each of the beams overlap with each other. Thereby, the laser welding apparatus 200 can suppress occurrence of poor welding at the time of welding the workpiece W.

Third Embodiment

Figure 17:
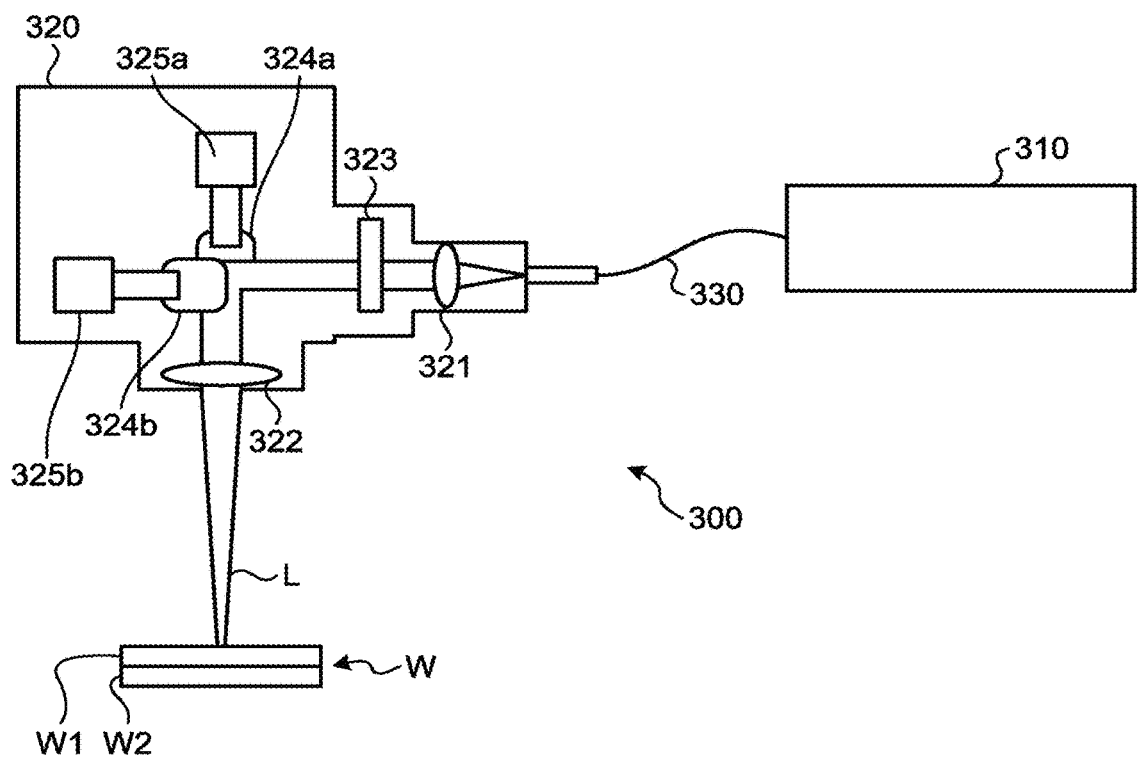
FIG. 17 is a schematic diagram illustrating a schematic configuration of a laser welding apparatus according to a third embodiment.

FIG. 17 is a schematic diagram illustrating a schematic configuration of a laser welding apparatus according to the third embodiment. A laser welding apparatus 300 irradiates the laser light L to the workpiece W for welding the workpiece W. The laser welding apparatus 300 achieves welding by the principle of action similar to those of the laser welding apparatuses 100 and 200. The configuration of the elements (a laser device 310 and an optical fiber 330) other than an optical head 320 is the same as the corresponding elements of the laser welding apparatuses 100 and 200. Therefore, only the device configuration of the optical head 320 will be described hereinafter.

Like the optical heads 120 and 220, the optical head 320 is an optical device for irradiating the workpiece W with laser light input from the laser device 310. The optical head 320 includes a collimating lens 321 and a condenser lens 322.

Furthermore, the optical head 320 includes a galvanoscanner disposed between the collimating lens 321 and the condenser lens 322. Angles of mirrors 324a and 324b of the galvanoscanner are changed by motors 325a and 325b, respectively. In the optical head 320, the galvanoscanner is set at the position different from that of the optical head 220. However, like the optical head 220, by controlling the angles of the two mirrors 324a and 324b, it is possible to sweep the laser light L by moving the irradiating position of the laser light L without moving the optical head 320.

The optical head 320 includes a diffractive optical element 323 as a beam shaper disposed between the collimating lens 321 and the condenser lens 322. Like the diffractive optical elements 123 and 223, the diffractive optical element 323 divides the laser light input from the collimating lens 321 into a plurality of beams of equivalent peak powers. Specifically, the diffractive optical element 323 divides the laser light such that the optical head 320 is able to irradiate the surface of the workpiece W with a plurality of beams by dispersing positions so that centers of the beams do not overlap with each other within a prescribed area on the surface. Note that the diffractive optical element 323 is designed to divide the laser light into a plurality of beams as illustrated in FIG. 3 and FIG. 9A to FIG. 9H, for example. At this time, the distance between the beams to be emitted is set such that the weld pools formed in the workpiece W by irradiation of each of the beams overlap with each other. Thereby, the laser welding apparatus 300 can suppress occurrence of poor welding at the time of welding the workpiece W.

Note that the diffractive optical elements in the embodiments described above divide laser light into a plurality of beams of equivalent peak powers. However, the peak powers of the beams may not have to be completely equivalent. If there is no beam included having a peak that is prominent to such an extent that poor welding may be caused, it can be considered that the beams have substantially the equivalent peak powers. Furthermore, the power distribution of each of the beams is not limited to be in a Gaussian shape but may be in other unimodal shapes. Furthermore, even in a case where the peak powers of each of the beams are not equivalent, the laser light may be divided and arranged such as to form a flat-top shape having no prominent sharp peak as in FIG. 3 when the power distributions of the whole beams are superposed.

Furthermore, when the neighboring beams among the divided beams do not overlap with each other, the distance between the centers of the beams is equal to or smaller than twenty times the beam diameter, for example. Furthermore, when the beams do not overlap with each other, it is preferable for the areas melted by each of the beams to overlap with each other. Note here that the area melted by each of the beams is an area melted because the temperature of the workpiece becomes higher than the melting point due to the energy of the beam, and the area size thereof may become wider than the beam diameter depending on the thermal conductivity and the like of the workpiece. In that case, the peak powers of each of the beams may be equivalent, may be substantially equivalent, or may be different. Furthermore, not dividing the laser light into a plurality of beams by the diffractive optical element, it is also possible to provide a plurality of laser light sources and use beams of the laser light output from each of the laser light sources as a plurality of beams.

Furthermore, while the workpiece W is formed by stacking the galvanized steel sheets W1 and W2 without a gap, the present disclosure can also be applied to a workpiece that is formed by stacking the galvanized steel sheets W1 and W2 with a gap. Furthermore, the plated sheet members configuring the workpiece W are not limited to the galvanized steel sheets, but it is also possible to apply the present disclosure to plated sheet members to be the subject of lap welding.

Furthermore, when sweeping the laser light L for the workpiece W, the surface area size of the weld pool may be expanded by performing sweeping by known wobbling or weaving.

Furthermore, the present disclosure is not limited by the embodiments described above. The present disclosure includes the configurations acquired by combining as appropriate the structural elements of each of the above-described embodiments. Furthermore, those skilled in the art can easily derive more effects and modification examples. Therefore, still broader aspects of the present disclosure are not limited to the embodiments described above, but various modifications are possible.

INDUSTRIAL APPLICABILITY

As described above, a wavelength-tunable laser and an optical module according to the present disclosure are preferably applied to optical communication.

The present disclosure is capable of providing such an effect that it is possible to suppress occurrence of poor welding when performing lap welding of the plated sheet members.

Although the disclosure has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

The invention claimed is:

1. A welding method, comprising:
   forming a workpiece by stacking plated sheet members having a plating layer formed on a surface of a base material;
   disposing the workpiece in an area to be irradiated with laser light;
   irradiating a surface of the workpiece with the laser light, wherein the laser light comprising a plurality of beams by dispersing positions such that centers of the plurality of beams do not overlap with each other within a prescribed area on the surface;
   while continuing the irradiation, relatively moving the plurality of beams and the workpiece and sweeping the plurality of beams on the workpiece so as to melt an irradiated part of the workpiece for performing welding; and
   setting a distance between the plurality of beams to be emitted such that weld pools formed in the workpiece by irradiation of each of the plurality of beams overlap with each other, wherein the plurality of beams within the prescribed area are arranged in one of the following arrangements (A) to (D):
   (A) one of the plurality of beams is positioned at a center of a first ring and a center of a second ring, both of the first ring and the second ring are formed by an arrangement of the other beams, and a radius of the first ring is larger than a radius of the second ring; (B) the plurality of beams consists of a first set of beams arranged in a first line and a second set of beams arranged in a second line with an endpoint of the second line being adjacent to an endpoint of the first line to form an apex of a V shape with the apex of V shape facing toward a direction of the sweep; and (C) one of the plurality of beams is positioned on a downstream side in a direction of the sweep with respect to a semicircular arc shape formed by an arrangement of the other beams, and is located near a center of the semicircular arc.

2. The welding method according to claim 1, wherein the plurality of beams are emitted by dispersing irradiating positions of the plurality of beams such that an evaporated gas of the plating layer located inside the workpiece is discharged from surfaces of the weld pools formed by melting the workpiece.

3. The welding method according to claim 2, wherein the plurality of beams are emitted by dispersing the irradiating positions such that a weld defect generated due to the gas does not exceed an allowable degree.

4. The welding method according to claim 1, wherein when the plurality of beams within the prescribed area are arranged in one of the arrangements (A), (B) and (C), the plurality of beams are arranged such that the prescribed area to be irradiated with the plurality of beams forms a shape gradually widening a width in a direction orthogonal to a direction of the sweep.

5. The welding method according to claim 1, wherein the plurality of beams have same peak powers as each other.

6. The welding method according to claim 1, wherein the plurality of beams are emitted such that the weld pools formed in the workpiece by irradiation of each of the plurality of beams overlap with each other.

7. The welding method according to claim 1, wherein an isolation distance between the centers of the plurality of beams is equal to or less than six times a beam diameter.

8. The welding method according to claim 1, wherein a beam diameter of each of the plurality of beams is equal to or less than 600 μm and above 0.

9. The welding method according to claim 1, wherein an isolation distance between the centers of the plurality of beams is equal to or less than 3600 μm.

10. The welding method according to claim 1, wherein when sweeping the plurality of beams for the workpiece, wobbling is performed.

11. The welding method according to claim 1, wherein when the plurality of beams within the prescribed area are arranged in the arrangement (B), the plurality of beams overlap with each other.

* * * * *